US012595444B2

(12) United States Patent
Okajima et al.

(10) Patent No.: US 12,595,444 B2
(45) Date of Patent: Apr. 7, 2026

(54) BEER-FLAVORED BEVERAGE

(71) Applicant: SUNTORY HOLDINGS LIMITED, Osaka (JP)

(72) Inventors: Takaho Okajima, Tokyo (JP); Taichi Maruhashi, Tokyo (JP); Takako Inui, Osaka (JP); Takeshi Kumagai, Tokyo (JP); Yuichi Kato, Tokyo (JP); Takamasa Hasegawa, Tokyo (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 463 days.

(21) Appl. No.: 18/022,885

(22) PCT Filed: Mar. 30, 2021

(86) PCT No.: PCT/JP2021/013681
§ 371 (c)(1),
(2) Date: Feb. 23, 2023

(87) PCT Pub. No.: WO2022/044411
PCT Pub. Date: Mar. 3, 2022

(65) Prior Publication Data
US 2023/0313087 A1     Oct. 5, 2023

(30) Foreign Application Priority Data

Aug. 31, 2020     (JP) ................................. 2020-146016

(51) Int. Cl.
| | |
|---|---|
| *C12C 5/02* | (2006.01) |
| *A23L 2/38* | (2021.01) |
| *A23L 2/56* | (2006.01) |
| *C12C 11/00* | (2006.01) |

(52) U.S. Cl.
CPC .............. *C12C 5/026* (2013.01); *A23L 2/382* (2013.01); *A23L 2/56* (2013.01); *C12C 11/00* (2013.01)

(58) Field of Classification Search
CPC ... C12G 3/02; C12G 3/06; C12G 3/04; C12G 3/021; C12C 11/00; C12C 12/006; C12C 12/002; C12C 11/02; C12C 5/026; A23L 2/382
See application file for complete search history.

(56) References Cited

FOREIGN PATENT DOCUMENTS

| | | |
|---|---|---|
| CN | 104812886 A | 7/2015 |
| JP | 2013-81417 A | 5/2013 |
| JP | 2015-116125 A | 6/2015 |
| JP | 2016-149975 A | 8/2016 |
| JP | 2018-64496 A | 4/2018 |

OTHER PUBLICATIONS

Office Action dated Dec. 30, 2024, issued in counterpart TW application No. 110111875. (4 pages).
International Search Report dated Jun. 15, 2021, issued in counterpart International Application No. PCT/JP2021/013681. (2 pages).

*Primary Examiner* — Vera Stulii
(74) *Attorney, Agent, or Firm* — WHDA, LLP

(57) ABSTRACT

Provided is a beer-taste beverage comprising 1000 ppb by mass or less of 4-vinylguaiacol, having an ethyl n-butyrate content of 140 ppb by mass or more, and comprising at least one lactone selected from γ-decanolactone and γ-undecalactone, wherein a ratio of the content (unit: ppb by mass) of ethyl n-butyrate to the total content (unit: ppb by mass) of the lactone [ethyl n-butyrate/lactone] is 1100 or less.

12 Claims, No Drawings

BEER-FLAVORED BEVERAGE

TECHNICAL FIELD

The present invention relates to a beer-taste beverage.

BACKGROUND ART

Heretofore, beer-taste beverages or production methods therefor have been studied in order to meet various demands in response to diversified preferences of consumers.

For example, Patent Literature 1 discloses an invention that relates to a method for producing a beer-taste fermented beverage, comprising the step of adding an amino acid of group a to an unfermented solution before the completion of fermentation in order to suppress increase in the amount of an aroma component formed, which becomes problematic for fermentation at a high temperature for beer-taste fermented beverages, wherein the fermentation is performed at a temperature of 12° C. or higher.

Patent Literature 2 discloses an invention that relates to a low-carbohydrate beer-taste fermented alcoholic beverage wherein malt and/or ungerminated barley or the like is used as a portion of raw materials, and a concentration of a peptide having a molecular weight of 10 to 20 kDa (gel filtration method) is 0.05 mg/ml or higher, for the purpose of providing a low-carbohydrate beer-taste alcoholic beverage having improved flavor.

CITATION LIST

Patent Literature

Patent Literature 1: JP-A-2015-116125
Patent Literature 2: JP-A-2016-149975

SUMMARY OF INVENTION

Technical Problem

Under these circumstances, there is a demand for a novel beer-taste beverage (e.g., a beer-taste beverage that offers perceivable well-balanced fresh scent and sweet scent suitable for a beer-taste beverage).

Solution to Problem

The present invention provides a beer-taste beverage having respective adjusted contents of 4-vinylguaiacol, ethyl n-butyrate, and a predetermined lactone. Specifically, the present invention provides the following aspects [1] to [12].

[1]
  A beer-taste beverage
  comprising 1000 ppb by mass or less of 4-vinylguaiacol,
  having an ethyl n-butyrate content of 140 ppb by mass or more, and
  comprising at least one lactone selected from γ-decanolactone and γ-undecalactone, wherein
  a ratio of the content (unit:ppb by mass) of ethyl n-butyrate to the total content (unit:ppb by mass) of the lactone [ethyl n-butyrate/lactone] is 1100 or less.
[2]
  The beer-taste beverage according to the above [1], wherein the total content of the lactone is 0.01 ppb by mass or more.

[3]
  The beer-taste beverage according to the above [1] or [2], wherein a ratio of the total content (unit:ppb by mass) of ethyl n-butyrate and the lactone to the content (unit:ppb by mass) of 4-vinylguaiacol [(ethyl n-butyrate+lactone)/4-vinylguaiacol] is 1.5 to 11.0.
[4]
  The beer-taste beverage according to any one of the above [1] to [3], wherein the beer-taste beverage has a bitterness unit of less than 60 BUs.
[5]
  The beer-taste beverage according to any one of the above [1] to [4], wherein the beer-taste beverage is a fermented beer-taste beverage.
[6]
  The beer-taste beverage according to any one of the above [1] to [5], wherein the beer-taste beverage has an original extract (O-Ex) concentration of 4.0 to 20.0% by mass.
[7]
  The beer-taste beverage according to any one of the above [1] to [6], wherein the beer-taste beverage has a total polyphenol content of 60 to 300 ppm by mass.
[8]
  The beer-taste beverage according to any one of the above [1] to [7], wherein the beer-taste beverage has a proline concentration of 3.5 to 60.0 ppm by mass.
[9]
  The beer-taste beverage according to any one of the above [1] to [8], wherein the beer-taste beverage has a malt ratio of 50 to 100% by mass.
[10]
  A beer-taste beverage wherein a ratio of the total content (unit:ppb by mass) of ethyl n-butyrate and at least one lactone selected from γ-decanolactone and γ-undecalactone to the content (unit:ppb by mass) of 4-vinylguaiacol [(ethyl n-butyrate+lactone)/4-vinylguaiacol] is 1.5 to 11.0.
[11]
  A method for producing a beer-taste beverage according to any one of the above [1] to [10], comprising the step of adding yeast to raw materials including water and malt to perform alcoholic fermentation.
[12]
  The method for producing a beer-taste beverage according to the above [11], wherein the yeast is top fermenting yeast.

Advantageous Effects of Invention

The beer-taste beverage according to a preferred aspect of the present invention can offer perceivable well-balanced fresh scent and sweet scent suitable for a beer-taste beverage, for example, and is capable of being a beverage with lighter mouthfeel.

DESCRIPTION OF EMBODIMENTS

1. Beer-Taste Beverage
  In the present specification, the "beer-taste beverage" refers to an alcohol-containing or non-alcoholic carbonated beverage having beer-like flavor. Hence, the "beer-taste beverage" includes not only beer which is a malt fermented beverage obtained by using malt, hop, and water as raw materials and fermenting these raw materials using yeast, but also a carbonated beverage having beer flavor. Specifically, the beer-taste beverage according to one aspect of the present invention includes any carbonated beverage having beer flavor by the addition of a beer fragrance including ester or a higher alcohol (e.g., isoamyl acetate, ethyl acetate, n-propanol, isobutanol, acetaldehyde, ethyl caproate, linalool, and 4-vinylguaiacol), unless otherwise specified.

The beer-taste beverage according to one aspect of the present invention may be a fermented beer-taste beverage that has undergone a fermentation step using yeast, or may be an unfermented beer-taste beverage that has not undergone the fermentation step.

The beer-taste beverage according to one aspect of the present invention may be an alcohol-containing beer-taste beverage having an alcohol percentage of 1% (v/v) or more, or may be a non-alcoholic beer-taste beverage having an alcohol percentage of less than 1% (v/v). The non-alcoholic beer-taste beverage may be a non-alcoholic fermented beer-taste beverage produced by performing a fermentation step and removing an alcohol resulting from the fermentation step, may be a beverage produced by terminating a fermentation step using yeast at a stage where the alcohol percentage is less than 1% (v/v), or may be a non-alcoholic unfermented beer-taste beverage prepared so as to have beer-like flavor without a fermentation step.

Besides, the beer-taste beverage according to one aspect of the present invention may be a malt-based beer-taste beverage obtained with malt as a raw material, or may be a malt-free beer-taste beverage obtained without the use of malt. A malt-based beer-taste beverage is preferred, and a barley malt-based beer-taste beverage is more preferred.

In addition, the fermented beer-taste beverage according to one aspect of the present invention may be an ale beer-taste beverage brewed through a fermentation step using top fermenting yeast (*Saccharomyces cerevisiae*, etc.), or may be a lager beer-taste beverage brewed through a fermentation step using bottom fermenting yeast.

The fermented beer-taste beverage according to one aspect of the present invention may be a distilled liquor-containing beer-taste beverage which contains a distilled liquor such as spirit, whiskey, or Shochu. Among them, a spirit-containing beer-taste beverage is preferred.

Among them, the beer-taste beverage according to one aspect of the present invention is preferably a fermented beer-taste beverage, more preferably an alcohol-containing fermented beer-taste beverage, further preferably a malt-based fermented beer-taste beverage or an ale beer-taste beverage, still further preferably beer also including ale beer.

The beer-taste beverage of the present invention is a beverage that focuses on aroma components 4-vinylguaiacol (hereinafter, also referred to as "4VG"), ethyl n-butyrate, and at least one lactone selected from γ-decanolactone and γ-undecalactone.

In the beer-taste beverage of the present invention, 4VG is a component that contributes to improvement in drinkability and attains a beverage with light mouthfeel. Ethyl n-butyrate is a component that contributes to improvement in fresh scent suitable for a beer-taste beverage. The lactone is a component that contributes to improvement in sweet scent suitable for a beer-taste beverage.

The beer-taste beverage according to one aspect of the present invention can offer perceivable well-balanced fresh scent and sweet scent suitable for a beer-taste beverage and is a beverage with lighter mouthfeel, by adjusting the contents of these components.

The beer-taste beverage according to one aspect of the present invention can contain 4VG from the viewpoint of improving drinkability and being a beverage with light mouthfeel.

The content of 4VG is preferably 1 ppb by mass or more, more preferably 5 ppb by mass or more, more preferably 10 ppb by mass or more, further preferably 20 ppb by mass or more, further preferably 30 ppb by mass or more, still further preferably 40 ppb by mass or more, particularly preferably 50 ppb by mass or more and may be 60 ppb by mass or more, 70 ppb by mass or more, 80 ppb by mass or more, 90 ppb by mass or more, 100 ppb by mass or more, 150 ppb by mass or more, 190 ppb by mass or more, 250 ppb by mass or more, 290 ppb by mass or more, 350 ppb by mass or more, 390 ppb by mass or more, 450 ppb by mass or more, or 490 ppb by mass or more, based on the total amount (100% by mass) of the beer-taste beverage from the viewpoint of being a beverage having more improved drinkability.

The content of 4VG is preferably 1000 ppb by mass or less, more preferably 920 ppb by mass or less, more preferably 820 ppb by mass or less, further preferably 720 ppb by mass or less, further preferably 620 ppb by mass or less, still further preferably 580 ppb by mass or less, particularly preferably 520 ppb by mass or less and may be 480 ppb by mass or less, 420 ppb by mass or less, 380 ppb by mass or less, 320 ppb by mass or less, 280 ppb by mass or less, or 220 ppb by mass or less, based on the total amount (100% by mass) of the beer-taste beverage from the viewpoint of suppressing smoke scent unsuitable for a beer-taste beverage and being a beverage with standing out fresh scent and sweet scent suitable for a beer-taste beverage.

The beer-taste beverage according to one aspect of the present invention can contain ethyl n-butyrate from the viewpoint of being a beverage excellent in fresh scent suitable for a beer-taste beverage.

However, the content of ethyl n-butyrate is preferably 140 ppb by mass or more, more preferably 150 ppb by mass or more, further preferably 160 ppb by mass or more, still further preferably 170 ppb by mass or more, particularly preferably 175 ppb by mass or more and may be 180 ppb by mass or more, 190 ppb by mass or more, 200 ppb by mass or more, 210 ppb by mass or more, 220 ppb by mass or more, or 230 ppb by mass or more, based on the total amount (100% by mass) of the beer-taste beverage from the viewpoint of being a beverage having more improved fresh scent suitable for a beer-taste beverage.

The content of ethyl n-butyrate is preferably 1000 ppb by mass or less, more preferably 900 ppb by mass or less, more preferably 800 ppb by mass or less, further preferably 700 ppb by mass or less, further preferably 600 ppb by mass or less, still further preferably 550 ppb by mass or less, particularly preferably 450 ppb by mass or less and may be 400 ppb by mass or less, 350 ppb by mass or less, 320 ppb by mass or less, 300 ppb by mass or less, or 280 ppb by mass or less, based on the total amount (100% by mass) of the beer-taste beverage from the same viewpoint as described above.

The beer-taste beverage according to one aspect of the present invention can contain at least one lactone selected from γ-decanolactone and γ-undecalactone from the viewpoint of being a beverage excellent in sweet scent suitable for a beer-taste beverage.

However, the total content of the lactone is preferably 0.01 ppb by mass or more, more preferably 0.05 ppb by mass or more, more preferably 0.1 ppb by mass or more, further preferably 0.2 ppb by mass or more, further preferably 0.3 ppb by mass or more, still further preferably 0.4 ppb by mass or more, particularly preferably 0.5 ppb by mass or more and may be 0.6 ppb by mass or more, 0.7 ppb by mass or more, 0.8 ppb by mass or more, 0.9 ppb by mass or more, 1.0 ppb by mass or more, or 1.1 ppb by mass or more, based on the total amount (100% by mass) of the beer-taste beverage from the viewpoint of being a beverage having more improved sweet scent suitable for a beer-taste beverage.

The total content of the lactone is preferably 300 ppb by mass or less, more preferably 200 ppb by mass or less, more preferably 100 ppb by mass or less, further preferably 50 ppb by mass or less, further preferably 20 ppb by mass or less, still further preferably 10 ppb by mass or less, particularly preferably 5.0 ppb by mass or less and may be 4.0 ppb by mass or less, 3.0 ppb by mass or less, 2.5 ppb by mass or less, 2.0 ppb by mass or less, or 1.6 ppb by mass or less, based on the total amount (100% by mass) of the beer-taste beverage from the same viewpoint as described above.

The beer-taste beverage according to one aspect of the present invention can contain at least one of γ-decanolactone and γ-undecalactone as the lactone and preferably contains both γ-decanolactone and γ-undecalactone from the viewpoint of being a beverage having more improved sweet scent suitable for a beer-taste beverage.

When the beer-taste beverage according to one aspect of the present invention contains both γ-decanolactone and γ-undecalactone, the ratio of the content (unit:ppb by mass) of γ-decanolactone to the content (unit:ppb by mass) of γ-undecalactone [γ-decanolactone/γ-undecalactone] is preferably 0.1 to 7.0, more preferably 0.2 to 5.0, more preferably 0.3 to 3.0, further preferably 0.4 to 2.5, further preferably 0.5 to 2.0, still further preferably 0.7 to 1.5, particularly preferably 0.8 to 1.2, from the viewpoint described above.

In the beer-taste beverage according to one aspect of the present invention, the content of γ-decanolactone is preferably 0.001 ppb by mass or more, more preferably 0.005 ppb by mass or more, more preferably 0.01 ppb by mass or more, further preferably 0.05 ppb by mass or more, further preferably 0.1 ppb by mass or more, still further preferably 0.2 ppb by mass or more, particularly preferably 0.3 ppb by mass or more and may be 0.35 ppb by mass or more, 0.4 ppb by mass or more, 0.45 ppb by mass or more, or 0.5 ppb by mass or more; and is preferably 300 ppb by mass or less, more preferably 100 ppb by mass or less, more preferably 50 ppb by mass or less, further preferably 10 ppb by mass or less, further preferably 5.0 ppb by mass or less, still further preferably 3.0 ppb by mass or less, particularly preferably 2.0 ppb by mass or less and may be 1.8 ppb by mass or less, 1.6 ppb by mass or less, 1.4 ppb by mass or less, 1.2 ppb by mass or less, 1.0 ppb by mass or less, or 0.80 ppb by mass or less, based on the total amount (100% by mass) of the beer-taste beverage.

In the beer-taste beverage according to one aspect of the present invention, the content of γ-undecalactone is preferably 0.001 ppb by mass or more, more preferably 0.005 ppb by mass or more, more preferably 0.01 ppb by mass or more, further preferably 0.05 ppb by mass or more, further preferably 0.1 ppb by mass or more, still further preferably 0.2 ppb by mass or more, particularly preferably 0.3 ppb by mass or more and may be 0.35 ppb by mass or more, 0.4 ppb by mass or more, 0.45 ppb by mass or more, or 0.5 ppb by mass or more; and is preferably 300 ppb by mass or less, more preferably 100 ppb by mass or less, more preferably 50 ppb by mass or less, further preferably 10 ppb by mass or less, further preferably 5.0 ppb by mass or less, still further preferably 3.0 ppb by mass or less, particularly preferably 2.0 ppb by mass or less and may be 1.8 ppb by mass or less, 1.6 ppb by mass or less, 1.4 ppb by mass or less, 1.2 ppb by mass or less, 1.0 ppb by mass or less, or 0.80 ppb by mass or less, based on the total amount (100% by mass) of the beer-taste beverage.

In the beer-taste beverage according to one aspect of the present invention, the ratio of the content (unit:ppb by mass)

of ethyl n-butyrate to the total content (unit:ppb by mass) of the lactone [ethyl n-butyrate/lactone] is preferably 50 or more, more preferably 80 or more, more preferably 100 or more, further preferably 120 or more, further preferably 140 or more, still further preferably 150 or more, still further preferably 160 or more, particularly preferably 180 or more and may be 185 or more, 190 or more, 195 or more, 200 or more, 205 or more or 210 or more, from the viewpoint of being a beverage that offers reasonably perceivable fresh scent suitable for a beer-taste beverage. The ratio is preferably 1100 or less, more preferably 1000 or less, more preferably 800 or less, further preferably 650 or less, further preferably 500 or less, still further preferably 400 or less, still further preferably 350 or less, particularly preferably 280 or less and may be 270 or less, 260 or less, 250 or less, 240 or less, or 230 or less, from the viewpoint of being a beverage that offers sufficiently perceivable sweet scent suitable for a beer-taste beverage while fresh scent suitable for a beer-taste beverage is perceived.

In the beer-taste beverage according to one aspect of the present invention, the ratio of the content (unit:ppb by mass) of ethyl n-butyrate to the content (unit: ppb by mass) of γ-decanolactone [ethyl n-butyrate/γ-decanolactone] is preferably 50 or more, more preferably 100 or more, more preferably 200 or more, further preferably 300 or more, further preferably 320 or more, still further preferably 330 or more, still further preferably 350 or more, particularly preferably 380 or more, from the viewpoint of being a beverage that offers reasonably perceivable fresh scent suitable for a beer-taste beverage. The ratio is preferably 2000 or less, more preferably 1700 or less, more preferably 1500 or less, further preferably 1200 or less, further preferably 1000 or less, still further preferably 800 or less, still further preferably 600 or less, particularly preferably 550 or less, from the viewpoint of being a beverage that offers sufficiently perceivable sweet scent suitable for a beer-taste beverage while fresh scent suitable for a beer-taste beverage is perceived.

In the beer-taste beverage according to one aspect of the present invention, the ratio of the content (unit:ppb by mass) of ethyl n-butyrate to the content (unit:ppb by mass) of γ-undecalactone [ethyl n-butyrate/γ-undecalactone] is preferably 50 or more, more preferably 100 or more, more preferably 200 or more, further preferably 300 or more, further preferably 320 or more, still further preferably 330 or more, still further preferably 350 or more, particularly preferably 380 or more, from the viewpoint of being a beverage that offers reasonably perceivable fresh scent suitable for a beer-taste beverage. The ratio is preferably 2000 or less, more preferably 1700 or less, more preferably 1500 or less, further preferably 1200 or less, further preferably 1000 or less, still further preferably 850 or less, still further preferably 600 or less, particularly preferably 550 or less, from the viewpoint of being a beverage that offers sufficiently perceivable sweet scent suitable for a beer-taste beverage while fresh scent suitable for a beer-taste beverage is perceived.

In the beer-taste beverage according to one aspect of the present invention, the ratio of the total content (unit:ppb by mass) of ethyl n-butyrate and the lactone to the content (unit:ppb by mass) of 4VG [(ethyl n-butyrate+lactone)/4VG] is preferably 1.5 or more, more preferably 1.7 or more, further preferably 1.9 or more, still further preferably 2.0 or more, particularly preferably 2.1 or more, and preferably 11.0 or less, more preferably 10.0 or less, more preferably 8.0 or less, further preferably 6.5 or less, further preferably 5.0 or less, still further preferably 4.0 or less, particularly preferably 3.0 or less, from the viewpoint of being a beverage with standing out fresh scent and sweet scent suitable for a beer-taste beverage.

The contents of 4VG, ethyl n-butyrate, and γ-decanolactone and γ-undecalactone constituting the lactone can be controlled, for example, not only by adjusting the amount of each component added but by appropriately adjusting the variety of a raw material (e.g., hop) having large contents of these components, the amount of the raw material used, the timing of addition of the raw material, fermentation conditions, etc.

The contents of 4VG, ethyl n-butyrate, and γ-decanolactone and γ-undecalactone constituting the lactone can be measured by gas chromatography/mass spectrometry (GC/MS).

For the beer-taste beverage according to one aspect of the present invention, it is preferred to adjust the contents of 4VG, ethyl n-butyrate, and at least one lactone selected from γ-decanolactone and γ-undecalactone, from the viewpoint of being able to offer perceivable well-balanced fresh scent and sweet scent suitable for a beer-taste beverage and being a beverage with lighter mouthfeel.

A specific aspect of the present invention based on the viewpoint described above includes a beer-taste beverage that satisfies the following requirements (I) to (III).

Requirement (I): the beer-taste beverage contains 1000 ppb by mass or less of 4-vinylguaiacol (4VG).

Requirement (II): the content of ethyl n-butyrate is 140 ppb by mass or more.

Requirement (III): the ratio of the content (unit:ppb by mass) of ethyl n-butyrate to the total content (unit:ppb by mass) of the lactone [ethyl n-butyrate/lactone] is 1100 or less.

In the beer-taste beverage of the present aspect, more preferred ranges of the content of 4VG, the content of ethyl n-butyrate, and the ratio [ethyl n-butyrate/lactone] defined by the requirements (I) to (III) are as mentioned above.

In the beer-taste beverage of the above aspect, in addition to the requirements (I) to (III), various requirements mentioned above (requirements for the content of γ-decanolactone, the content of γ-undecalactone, the total content of the lactone, the ratio [γ-decanolactone/γ-undecalactone], the ratio [ethyl n-butyrate/γ-decanolactone], the ratio [ethyl n-butyrate/γ-undecalactone], and the ratio [(ethyl n-butyrate+lactone)/4VG]) may be adjusted so as to be further satisfied together with the requirements (I) to (III).

Another specific aspect of the present invention based on the viewpoint described above includes a beer-taste beverage that satisfies the following requirement (IV).

Requirement (IV): the ratio of the total content (unit:ppb by mass) of ethyl n-butyrate and at least one lactone selected from γ-decanolactone and γ-undecalactone to the content (unit:ppb by mass) of 4-vinylguaiacol [(ethyl n-butyrate+lactone)/4-vinylguaiacol] is 1.5 to 11.0.

In the beer-taste beverage of the present aspect, a more preferred range of the ratio [(ethyl n-butyrate+lactone)/4-vinylguaiacol] defined by the requirement (IV) is as mentioned above.

In the beer-taste beverage of the above aspect, in addition to the requirement (IV), various requirements mentioned above (requirements for the content of 4VG, the content of ethyl n-butyrate, the content of γ-decanolactone, the content of γ-undecalactone, the total content of the lactone, the ratio [ethyl n-butyrate/lactone], the ratio [γ-decanolactone/γ-undecalactone], the ratio [ethyl n-butyrate/γ-decanolactone], and the ratio [ethyl n-butyrate/γ-undecalactone]) may be adjusted so as to be further satisfied together with the requirement (IV).

The bitterness unit of the beer-taste beverage according to one aspect of the present invention is preferably less than 60 BUs, more preferably 55 BUs or less, further preferably 50 BUs or less, still further preferably 45 BUs or less, particularly preferably 40 BUs or less and may be 35 BUs or less, 30 BUs or less, or 25 BUs or less, from the viewpoint of being a beverage suitable as a beer-taste beverage.

When the beer-taste beverage according to one aspect of the present invention is a beverage obtained with hop as a raw material, the bitterness unit of the beverage may be 5 BUs or more, 7 BUs or more, 10 BUs or more, 12 BUs or more, or 15 BUs or more.

When the beer-taste beverage according to one aspect of the present invention is a beverage obtained without the use of hop as a raw material, the bitterness unit of the beverage may be less than 5.0 BUs, 3.0 BUs or less, 2.0 BUs or less, 1.0 BUs or less, 0.5 BUs or less, or 0.3 BUs or less.

The bitterness unit of the beer-taste beverage according to one aspect of the present invention is an index for bitterness offered by a component derived from hop composed mainly of isohumulone, and can be controlled by appropriately adjusting the amount of hop or a hop-derived component (e.g., a hop extract) used.

In the present specification, the "bitterness unit" of the beverage can be measured by a measurement method described in "8.15 Bitterness unit" of revised BCOJ beer analysis method (Journal of the Brewing Society of Japan, Brewery Convention of Japan [analysis committee] ed., enlarged and revised in 2013).

The original extract (O-Ex) concentration of the beer-taste beverage according to one aspect of the present invention is preferably 4.0 to 20.0% by mass, more preferably 4.5 to 18.0% by mass, further preferably 7.0 to 16.0% by mass, still further preferably 8.0 to 15.0% by mass, particularly preferably 8.5 to 13.5% by mass, from the viewpoint of being an easier-to-drink beverage by conferring light mouthfeel and from the viewpoint of being a beverage with standing out fresh scent and sweet scent suitable for a beer-taste beverage.

In the present specification, the "original extract concentration" has the same meaning as that of an "original wort extract concentration". In the present specification, the "original extract concentration" refers to an extract content according to the Liquor Tax Act of Japan, i.e., the number of grams of an involatile component contained in 100 cm$^3$ of original volume at a temperature of 15° C., in an alcohol-containing beverage having an alcohol percentage of 1% (v/v) or more. Also, the original extract concentration refers to an extract level (% by mass) measured from a degassed sample in accordance with an analysis method stipulated by the Brewery Convention of Japan (BCOJ), Brewers Association of Japan (BCOJ beer analysis method (issued by Brewing Society of Japan, edited by Brewers Association of Japan, 2013 enlarged and revised edition)), in a non-alcoholic beverage having an alcohol percentage of less than 1% (v/v).

The total polyphenol content of the beer-taste beverage according to one aspect of the present invention is preferably 60 ppm by mass or more, more preferably 65 ppm by mass or more, further preferably 75 ppm by mass or more, still further preferably 90 ppm by mass or more, particularly preferably 105 ppm by mass or more, based on the total amount (100% by mass) of the beer-taste beverage from the viewpoint of being a beer-taste beverage that has good taste and is more suitable as beer. The total polyphenol content is preferably 300 ppm by mass or less, more preferably 260 ppm by mass or less, further preferably 240 ppm by mass or less, still further preferably 220 ppm by mass or less, particularly preferably 200 ppm by mass or less, from the viewpoint of being a beverage having good colloidal stability and being an easier-to-drink beverage by conferring light mouthfeel.

In the present specification, the "total polyphenol content" means the total amount of polyphenol contained in the total amount (100% by mass) of the beer-taste beverage.

The polyphenol means a compound in which two or more hydrogen atoms of aromatic hydrocarbon are replaced with hydroxyl groups. Specific examples thereof include flavonol, isoflavone, tannin, catechin, quercetin, and anthocyanin.

In the present specification, the total polyphenol content can be measured by, for example, a method described in revised BCOJ beer analysis method (issued by Brewing Society of Japan, edited by Brewers Association of Japan [Analysis Committee], 2013 enlarged and revised edition).

The total polyphenol content can be controlled, for example, by adjusting the amount of a raw material with a large polyphenol content (e.g., barley malt or malt husk) used.

In general, for example, malt having husk is rich in polyphenol while soybean, yeast extracts, wheat, wheat malt, and the like has a small amount of polyphenol. The total polyphenol content can be adjusted to a desired range by appropriately selecting a such a raw material and adjusting the amount of the raw material used.

The proline concentration of the beer-taste beverage according to one aspect of the present invention is preferably 3.5 to 60.0 ppm by mass and may be 4.0 ppm by mass or higher, 4.5 ppm by mass or higher, 6.0 ppm by mass or higher, 8.0 ppm by mass or higher, 10.0 ppm by mass or higher, 15.0 ppm by mass or higher, 20.0 ppm by mass or higher, or 25.0 ppm by mass or higher and may be 55.0 ppm by mass or lower, 50.0 ppm by mass or lower, 45.0 ppm by mass or lower, or 40.0 ppm by mass or lower, based on the total amount (100% by mass) of the beer-taste beverage.

Proline is an amino acid that is relatively abundantly contained in malt or the like and rarely varies in content between before and after a fermentation step. When the content of this proline falls within the above range, the beer-taste beverage can have better taste.

In the present specification, the proline concentration can be measured by, for example, an automatic amino acid analysis method using Hitachi L-8800 High-Speed Amino Acid Analyzer.

The malt ratio of the beer-taste beverage according to one aspect of the present invention is 50 to 100% by mass and may be 55% by mass or more, 60% by mass or more, 65% by mass or more, or 70% by mass or more and may be 95% by mass or less, 90% by mass or less, 80% by mass or less, or less than 70% by mass.

In the present specification, the "malt ratio" means a value calculated according to the Liquor Tax Act and interpretive letters on laws and regulations, etc. related to liquor administration enforced on Apr. 1, 2018.

As mentioned above, the beer-taste beverage according to one aspect of the present invention may be an alcohol-containing beer-taste beverage or may be a non-alcoholic beer-taste beverage.

The alcohol percentage of the beer-taste beverage according to one aspect of the present invention which is an alcohol-containing beer-taste beverage is preferably 3.0% (v/v) or more, more preferably 4.0% (v/v) or more, more preferably 4.6% (v/v) or more, further preferably 5.1% (v/v) or more, still further preferably 5.4% (v/v) or more, particularly preferably 5.7% (v/v) or more, from the viewpoint of being a beverage that can offer a feeling of refreshing stimulation.

The alcohol percentage is preferably 20.0% (v/v) or less, more preferably 15.0% (v/v) or less, further preferably 10.0% (v/v) or less, from the viewpoint of being an easy-to-drink beer-taste beverage.

In the present specification, the alcohol percentage is indicated by percentage based on volume/volume (v/v %). The alcohol content of the beverage can be measured by any method known in the art and can be measured with, for example, an oscillating densitometer.

In the beer-taste beverage according to one aspect of the present invention, a possible approach for adjusting the alcohol percentage involves allowing the beer-taste beverage to further contain spirit derived from grain as an alcohol component for adjustment.

In this context, the spirit means a liquor that is obtained by saccharifying grain such as barley, rice, buckwheat, or corn as a raw material using malt or optionally an enzyme agent, and fermenting the resultant using yeast, followed by further distillation.

However, the beer-taste beverage according to one aspect of the present invention preferably contains no spirit from the viewpoint of being a beer-taste beverage that has good taste and is suitable as beer.

The beer-taste beverage according to one aspect of the present invention is preferably beer from the same viewpoint as described above.

In the present specification, the "beer" refers to a beverage that is obtained by using malt, hop, and water as raw materials and fermenting these using yeast, and means a beverage defined by the Liquor Tax Act and interpretive letters on laws and regulations, etc. related to liquor administration enforced on Apr. 1, 2018.

Specifically, when the beer-taste beverage according to one aspect of the present invention is beer, the alcohol percentage mentioned above is adjusted by a fermentation step using yeast.

The color of the beer-taste beverage according to one aspect of the present invention is not particularly limited and may be amber or gold as in usual beer, may be black as in black beer, or may be clear, colorless. Alternatively, the desired color may be applied thereto by the addition of a colorant or the like. The color of the beer-taste beverage can be macroscopically identified and may be specified depending on total light transmittance, chromaticity, or the like.

The pH of the beer-taste beverage according to one aspect of the present invention is not particularly limited and is preferably 2.0 to 5.0, more preferably 3.0 to 4.6, further preferably 4.0 to 4.55. When the pH of the beer-taste beverage is 4.5 or lower, the generation of microbes can be suppressed. When the pH is 2.0 or higher, the flavor of the beverage is easily improved.

The beer-taste beverage according to one aspect of the present invention can be in the form of a beverage packaged in a container. Examples of the container include bottles, plastic bottles, cans, and barrels. Particularly, a can, a bottle or a plastic bottle is preferred from the viewpoint of being easy to carry around.

1.1 Raw Material

In the beer-taste beverage according to one aspect of the present invention, malt may be used, together with water, as a main raw material, or malt may not be used. The beer-taste beverage according to one aspect of the present invention may be a beverage obtained with hop as a raw material or may be a beverage obtained without the use of hop.

In addition, a preservative, a sweetener, water-soluble dietary fiber, a bittering agent or a bitterness-imparting agent, an antioxidant, a fragrance, an acidulant, a salt, and the like may be used.

1.1.1 Malt and Grain Other than Malt

In the case of using malt as a raw material, the malt refers to a material obtained by germinating, drying, and root-removing the seeds of barley, wheat, rye, *Avena fatua*, oat, *Coix lacryma-jobi* var. *ma-yuen, Avena sativa*, or the like, and is not limited by its producing area or variety.

The malt for use in one aspect of the present invention is preferably barley malt. The barley malt is malt that is used as one of the most general raw materials of Japanese beer-taste beverages. The type of barley includes two-row barley, six-row barley, or the like, any of which may be used. Normal malt as well as colored malt or the like may be used. When colored malt is used, different types of colored malt may be used in appropriate combination, or one type of colored malt may be used.

In the beer-taste beverage according to one aspect of the present invention, preferably, the malt used is appropriately selected according to the desired chromaticity of the beer-taste beverage. The malt to be selected may be used singly, or two or more thereof may be used in combination.

Grain other than malt may be used together with malt.

Examples of such grain include barley, wheat, rye, *Avena fatua*, oat, *Coix lacryma-jobi* var. *ma-yuen*, and *Avena sativa* which do not correspond to malt, rice (white rice, brown rice, etc.), corn, kaoliang, potato, pulses (soybean, pea, etc.), buckwheat, sorghum, foxtail millet, Japanese millet, and starch obtained therefrom, and their extracts.

When malt is not used, the beer-taste beverage is obtained using liquid sugar containing a carbon source, and a nitrogen source as an amino acid-containing material (e.g., soybean protein) such as the grain mentioned above other than malt.

1.1.2 Hop

In the case of using hop in one aspect of the present invention, examples of the form of the hop include pellet hop, powder hop, and hop extracts. The hop used may be a hop processed product such as isomerized hop or reduced hop.

In the case of using hop in one aspect of the present invention, the amount of the hop added is appropriately adjusted such that the bitterness unit falls within the range mentioned above. The amount is, for example, preferably 0.0001 to 1% by mass based on the total amount (100% by mass) of raw materials of the beverage.

The beer-taste beverage obtained with hop as a raw material is a beverage containing iso-α acid which is a component derived from hop. The content of iso-α acid in the beer-taste beverage obtained with hop may be more than 0.1 ppm by mass and may be more than 1.0 ppm by mass, based on the total amount (100% by mass) of the beer-taste beverage.

On the other hand, the content of iso-α acid in the beer-taste beverage obtained without hop may be 0.1 ppm by mass or less based on the total amount (100% by mass) of the beer-taste beverage.

In the present specification, the content of iso-α acid means a value measured by a high-performance liquid chromatography (HPLC) analysis method described in revised BCOJ beer analysis method (issued by Brewing Society of Japan, edited by Brewers Association of Japan [Analysis Committee], 2013 enlarged and revised edition).

1.1.3 Preservative

The beer-taste beverage according to one aspect of the present invention may be a beverage further supplemented with a preservative.

Examples of the preservative for use in one aspect of the present invention include: benzoic acid; benzoate such as sodium benzoate; benzoic acid ester such as propyl p-hydroxybenzoate and butyl p-hydroxybenzoate; and dimethyl dicarbonate. A commercially available formulation such as Strong SANPRESER (manufactured by San-Ei Gen F.F.I., Inc., a mixture of sodium benzoate and butyl benzoate) may be used as the preservative.

These preservatives may each be used singly, or two or more thereof may be used in combination.

When the beer-taste beverage according to one aspect of the present invention is supplemented with a preservative, the amount of the preservative added is preferably 5 to 1200 ppm by mass, more preferably 10 to 1100 ppm by mass, further preferably 15 to 1000 ppm by mass, still further preferably 20 to 900 ppm by mass.

1.1.4 Sweetener

The beer-taste beverage according to one aspect of the present invention may be a beverage further supplemented with a sweetener.

Examples of the sweetener for use in one aspect of the present invention include commercially available saccharified solutions obtained by degrading grain-derived starch with an acid or an enzyme, saccharides such as commercially available starch syrups, trisaccharides or higher polysaccharides, sugar alcohols, natural sweeteners such as stevia, and artificial sweeteners.

These sweeteners may each be used singly, or two or more thereof may be used in combination.

The form of such a saccharide may be a liquid such as a solution or may be a solid such as a powder.

The type of the raw material grain of the starch, a method for purifying the starch, and conditions for treatment such as hydrolysis with an enzyme or an acid are not particularly limited. A saccharide with an elevated ratio of maltose may be used by appropriately setting the conditions for hydrolysis with an enzyme or an acid. In addition, for example, sucrose, fructose, glucose, maltose, trehalose, maltotriose and their solutions (molasses) may be used.

Examples of the artificial sweetener include aspartame, acesulfame potassium (acesulfame K), and sucralose.

Examples of the water-soluble dietary fiber include resistant dextrin, polydextrose, guar gum degradation products, pectin, glucomannan, alginic acid, laminarin, fucoidin, and carrageenan. Resistant dextrin or polydextrose is preferred from the viewpoint of general versatility such as stability or safety.

1.1.5 Bittering Agent and Bitterness-Imparting Agent

The beer-taste beverage according to one aspect of the present invention may be a beverage further supplemented with one or more members selected from a bittering agent and a bitterness-imparting agent.

In the beer-taste beverage according to one aspect of the present invention, bitterness may be conferred by hop, or the bittering agent or the bitterness-imparting agent given below may be used together with hop. Alternatively, the bittering agent or the bitterness-imparting agent given below may be used without the use of hop or instead of hop.

The bittering agent or the bitterness-imparting agent is not particularly limited, and any bitterness-imparting agent for use in usual beer or sparkling liquors can be used. Examples thereof include rosemary, litchi, caraway, juniper berry, sage, rosemary, reishi mushroom, bay leaves, quassin, caffein, absinthin, naringin, citrus extracts, quassia extracts, coffee extracts, tea extracts, bitter gourd extracts, lotus germ extracts, krantz aloe extracts, rosemary extracts, litchi extracts, bay leaf extracts, sage extracts, and caraway extracts.

These bittering agents and bitterness-imparting agents may each be used singly, or two or more thereof may be used in combination.

1.1.6 Antioxidant

The beer-taste beverage according to one aspect of the present invention may be a beverage further supplemented with an antioxidant.

The antioxidant is not particularly limited, and any antioxidant for use in usual beer or sparkling liquors can be used. Examples thereof include ascorbic acid, erythorbic acid, and catechin.

These antioxidants may each be used singly, or two or more thereof may be used in combination.

1.1.7 Fragrance

The beer-taste beverage according to one aspect of the present invention may be a beverage further supplemented with a fragrance.

The fragrance is not particularly limited, and a general beer fragrance can be used. The beer fragrance is used for conferring beer-like flavor.

Examples of the beer fragrance include ester and higher alcohols and specifically include ethyl acetate, isoamyl acetate, n-propanol, isobutanol, acetaldehyde, ethyl caproate, and linalool.

These fragrances may each be used singly, or two or more thereof may be used in combination.

1.1.8 Acidulant

The beer-taste beverage according to one aspect of the present invention may be a beverage further supplemented with an acidulant.

The acidulant is not particularly limited as long as the acidulant is a substance having acidity. Examples thereof include tartaric acid, phosphoric acid, citric acid, gluconic acid, lactic acid, malic acid, phytic acid, acetic acid, succinic acid, glucono delta lactone and their salts.

Among them, at least one member selected from tartaric acid, phosphoric acid, citric acid, gluconic acid, lactic acid, malic acid, phytic acid, acetic acid, succinic acid and their salts is preferred, at least one member selected from tartaric acid, phosphoric acid, citric acid, lactic acid, tartaric acid, acetic acid and their salts is more preferred, and at least one member selected from tartaric acid, phosphoric acid, and lactic acid is further preferred.

These acidulants may each be used singly, or two or more thereof may be used in combination.

1.1.9 Salt

The beer-taste beverage according to one aspect of the present invention may be a beverage further supplemented with a salt.

Examples of the salt include sodium chloride, acidic potassium phosphate, acidic calcium phosphate, ammonium phosphate, magnesium sulfate, calcium sulfate, potassium metabisulfite, calcium chloride, magnesium chloride, potassium nitrate, and ammonium sulfate.

These salts may each be used singly, or two or more thereof may be used in combination.

1.2 Carbon Dioxide

Carbon dioxide contained in a raw material may be used as carbon dioxide contained in the beer-taste beverage according to one aspect of the present invention, or may be dissolved, for example, by mixing with carbonated water or addition of carbon dioxide.

Carbon dioxide resulting from a fermentation step of the beer-taste beverage can be directly used, and the amount of carbon dioxide may be adjusted by appropriately adding carbonated water.

The carbon dioxide concentration of the beer-taste beverage according to one aspect of the present invention is preferably 0.30% (w/w) or more, more preferably 0.35% (w/w) or more, further preferably 0.40% (w/w) or more, still further preferably 0.42% (w/w) or more, particularly preferably 0.45% (w/w) or more and preferably 0.80% (w/w) or less, more preferably 0.70% (w/w) or less, further preferably 0.60% (w/w) or less, still further preferably 0.57% (w/w) or less, particularly preferably 0.55% (w/w) or less.

In the present specification, the carbon dioxide concentration can be determined by dipping a container containing a beverage of interest in a water bath of 20° C. for 30 minutes or longer with occasional shaking to adjust the temperature of the beverage to 20° C., followed by measurement using a gas volume measurement apparatus (e.g., GVA-500 (manufactured by Kyoto Electronics Manufacturing Co., Ltd.)).

When the beer-taste beverage according to one aspect of the present invention is a packaged beverage, the carbon dioxide pressure of the packaged beverage can be appropriately adjusted within a range that attains the carbon dioxide concentration described above. The carbon dioxide pressure of the beverage may be 5.0 kg/cm$^2$ or lower, 4.5 kg/cm$^2$ or lower, or 4.0 kg/cm$^2$ or lower and may be 0.20 kg/cm$^2$ or higher, 0.50 kg/cm$^2$ or higher, or 1.0 kg/cm$^2$ or higher. These upper limits and lower limits may be combined in any way. The carbon dioxide pressure of the beverage can be, for example, 0.20 kg/cm$^2$ or higher and 5.0 kg/cm$^2$ or lower, 0.50 kg/cm$^2$ or higher and 4.5 kg/cm$^2$ or lower, or 1.0 kg/cm$^2$ or higher and 4.0 kg/cm$^2$ or lower.

In the present specification, such a gas pressure refers to a gas pressure within a container unless otherwise specified.

The pressure can be measured by use of a method well known to those skilled in the art, for example, a method of fixing a sample set to 20° C. in an internal gas pressure gauge, then temporarily opening the stopper cock of the internal gas pressure gauge for degassing, closing the stopper cock again, shaking the internal gas pressure gauge, and reading a value when an indicator needle reaches a given position, or can be measured using a commercially available gas pressure measurement apparatus.

1.3 Other Additives

The beer-taste beverage according to one aspect of the present invention may be supplemented with various additives, if necessary, without interfering with the advantageous effects of the present invention.

Examples of such additives include colorants, foam forming agents, fermentation accelerators, yeast extracts, protein materials such as peptide-containing matter, and seasonings such as amino acids.

The colorant is used for imparting beer-like color to the beverage, and a caramel dye or the like can be used. The foam forming agent is used for forming beer-like foam in the beverage or for retaining the foam of the beverage. For example, a plant extract saponin material such as soybean saponin or quillaia saponin, a vegetable (e.g., corn or soybean) protein, peptide-containing matter such as a collagen peptide, and a yeast extract can be appropriately used.

The fermentation accelerator is used for accelerating fermentation mediated by yeast. For example, a yeast extract, a bran component of rice, barley, or the like, a vitamin, and a mineral agent can be used singly or in combination.

1.4 Packaged Beverage

The beer-taste beverage according to one aspect of the present invention may be a packaged beverage in which the beverage is packaged in a container. A container having any form and material may be used in the packaged beverage. Examples of the container include bottles, cans, barrels, and plastic bottles. Particularly, a can, a bottle or a plastic bottle is preferred from the viewpoint of being easy to carry around.

2 Method for Producing Beer-Taste Beverage

The method for producing the beer-taste beverage according to one aspect of the present invention is not particularly limited and may be a method for producing a fermented beer-taste beverage through a fermentation step or may be a method for producing an unfermented beer-taste beverage without a fermentation step.

2.1 Method for Producing Fermented Beer-Taste Beverage

When the beer-taste beverage according to one aspect of the present invention is a fermented beer-taste beverage, the method for producing the fermented beer-taste beverage according to one aspect of the present invention is preferably a method comprising the step of adding yeast to raw materials including water and malt to perform alcoholic fermentation. More specifically, a method comprising the following steps (1) to (3) is more preferred.

Step (1): the step of performing at least one treatment selected from saccharification treatment, boiling treatment, and solid removal treatment using various raw materials to obtain a pre-fermentation liquid.

Step (2): the step of adding yeast to the pre-fermentation liquid obtained in the step (1) to perform alcoholic fermentation.

Step (3): the step of confirming and/or adjusting the contents of 4VG, ethyl n-butyrate, and at least one lactone selected from γ-decanolactone and γ-undecalactone.

In the case of producing a beverage having a bitterness unit of 5 BUs or more, the production method according to one aspect of the present invention preferably comprises the step of adding hop as a raw material. In the case of producing a beverage having a bitterness unit of less than 5 BUs, the method preferably does not comprise the step of adding hop as a raw material.

In one aspect of the present invention, the step of adding spirit derived from grain is preferably absent from the viewpoint of producing a beverage that has good taste and is suitable as beer.

<Step (1)>

The step (1) is the step of performing at least one treatment selected from saccharification treatment, boiling treatment, and solid removal treatment using various raw materials to obtain a pre-fermentation liquid.

In the case of using, for example, malt, as one of the various raw materials, the various raw materials including water and malt are added to a preparation kettle or a preparation tank, and an enzyme such as amylase or protease is added thereto, if necessary. Hop, dietary fiber, a preservative, a sweetener, an antioxidant, a bitterness-imparting agent, a fragrance, an acidulant, a dye, and the like may be added as the various raw materials other than malt. These raw materials may be added before saccharification treatment, may be added during saccharification treatment, or may be added after the completion of saccharification treatment. Alternatively, these raw materials may be added after alcoholic fermentation in the subsequent step.

The mixture of the various raw materials is warmed so that starchy raw materials are saccharified to perform saccharification treatment.

It is preferred that the temperature and time of the saccharification treatment should be appropriately adjusted in consideration of the type of the malt used, a malt ratio, raw materials other than water and malt, the type and amount of the enzyme used, the original extract concentration of a finally obtained beverage, etc. In one aspect of the present invention, the temperature of the saccharification treatment is, for example, preferably 55 to 75° C., and the time of the saccharification treatment is preferably 30 to 240 minutes. After the saccharification treatment, lauter is performed to obtain a saccharified solution.

This saccharified solution is preferably subjected to boiling treatment.

In the case of using hop, a bittering agent, and the like as raw materials, it is preferred to add these raw materials when this boiling treatment is performed. The raw materials such as hop and a bittering agent may be added after the start of boiling of the saccharified solution and before the completion of the boiling.

After the completion of the boiling treatment, the solution is transferred to a whirl pool and cooled to 0 to 20° C. to prepare a cooled solution, after which removal treatment of solids such as coagulated proteins is preferably performed. This treatment can adjust the original extract concentration to within the range mentioned above. In this way, a pre-fermentation liquid is obtained.

Hop, a bittering agent, and the like may be added to a malt extract supplemented with hot water, instead of the saccharified solution described above, and boiling treatment can be performed to prepare a pre-fermentation liquid.

In the case of not using malt as the various raw materials, liquid sugar containing a carbon source, barley, etc. or a nitrogen source as an amino acid-containing raw material other than malt, hop, dietary fiber, a preservative, a sweetener, an antioxidant, a bitterness-imparting agent, a fragrance, an acidulant, a dye, and the like are mixed with hot water to prepare a liquid sugar solution. The liquid sugar solution may be subjected to boiling treatment to prepare a pre-fermentation liquid.

In the case of using hop, the hop may be added before boiling treatment or may be added after the start of boiling of the liquid sugar solution and before the completion of the boiling.

<Step (2)>

This step is the step of adding yeast to the pre-fermentation liquid obtained in the step (1) to perform alcoholic fermentation.

The yeast for use in this step can be appropriately selected in consideration of the type of the fermented beverage to be produced, intended flavor, fermentation conditions, etc. Top fermenting yeast may be used, or bottom fermenting yeast may be used. Top fermenting yeast is preferably used from the viewpoint of adjusting the contents of 4VG, ethyl n-butyrate, and the lactone. Examples of the top fermenting yeast for use in one aspect of the present invention include *Saccharomyces cerevisiae*.

The yeast may be added as a yeast suspension to the raw materials, or slurry of the yeast concentrated by centrifugation or precipitation may be added to the raw materials. Alternatively, a supernatant after centrifugation may be completely removed, and the resultant can be added. The amount of the yeast added to a raw material liquid can be appropriately set and is on the order of, for example, $5 \times 10^6$ cells/mL to $1 \times 10^8$ cells/mL.

The conditions for alcoholic fermentation, such as a fermentation temperature and a fermentation period can be appropriately set. The fermentation may be performed under conditions of 8 to 25° C. and 5 to 10 days from the viewpoint of adjusting the contents of 4VG, ethyl n-butyrate, and the lactone. The temperature (increase or decrease in temperature) or pressure of the fermented solution may be changed during the fermentation step.

After the completion of this step, the yeast may be removed with a lautering machine or the like, and water or additives such as a fragrance, an acidulant, and a dye can be added, if necessary, to the resultant.

<Step (3)>

The step (3) is the step of confirming and/or adjusting the contents of 4VG, ethyl n-butyrate, and at least one lactone selected from γ-decanolactone and γ-undecalactone.

The contents of 4VG, ethyl n-butyrate, and the lactone may be adjusted by appropriately setting the variety of a raw material, the amount of a raw material added, preparation conditions (the timing of addition of a raw material, etc.), a yeast species, fermentation conditions, etc. in the steps (1) and (2). Accordingly, in the step (3), the contents of these components are preferably measured to confirm whether the contents fall within the ranges mentioned above. If the content of any component among these components falls outside the range, it is preferred to perform adjustment by the addition of the component whose content falls outside the range or adjustment by dilution.

The adjustment of the content of each component in this step may be performed in parallel with the step (1) and/or the step (2), may be performed between the step (1) and the step (2), or may be performed after the step (2). The confirmation of the content of each component in this step may be performed at any of the timings described above. It is preferred to confirm the content of each component after the step (2) and, if any component consequently requires adjustment, to adjust the content of this component.

In one aspect of the present invention, in the case of producing a non-alcoholic fermented beer-taste beverage, it is preferred to further perform steps (4) and (5).

Step (4): the step of removing alcohols from the fermented solution after the step (2).

Step (5): the step of adjusting the amount of carbon dioxide after the step (4).

In the case of producing a non-alcoholic fermented beer-taste beverage, the step (3) may be performed between the step (2) and the step (4), may be performed between the step (4) and the step (5), or may be performed after the step (5), and is preferably performed at least after the step (4).

In the step (4), the method for removing alcohols resulting from the fermentation step of the step (2) is preferably a method of performing removal by heat treatment. Conditions similar to those of a general method for producing a non-alcoholic beer-taste beverage can be applied to conditions for heat treatment.

After the step (4), the alcohols have been removed from the solution while carbon dioxide has also been removed. Hence, the amount of carbon dioxide is preferably adjusted by the step (5).

As for the method for adding carbon dioxide, the carbon dioxide may be added by mixing the solution obtained after the step (4) with carbonated water, or may be added directly to the solution obtained after the step (4).

2.2 Method for Producing Unfermented Beer-Taste Beverage

When the beer-taste beverage according to one aspect of the present invention is an unfermented beer-taste beverage, the beer-taste beverage can be produced by a general method for producing an unfermented beer-taste beverage. Specific examples of the method for producing the unfermented beer-taste beverage according to one aspect of the present invention include a method comprising the following steps (a) to (c).

Step (a): the step of performing at least one treatment selected from saccharification treatment, boiling treatment, and solid removal treatment using various raw materials to obtain a primary raw material liquid.

Step (b): the step of adding a liquor, if necessary, to the primary raw material liquid and adding carbon dioxide thereto by carbonation treatment.

Step (c): the step of confirming and/or adjusting the contents of 4VG, ethyl n-butyrate, and at least one lactone selected from γ-decanolactone and γ-undecalactone.

Precipitates may be separated and removed, if necessary, by filtration, centrifugation, or the like at each stage. These steps are capable of conveniently producing an unfermented beer-taste beverage, even without fermentation equipment, by using a usual soft drink production process.

Specific examples of the method for obtaining a primary raw material liquid by the step (a) include methods similar to those in the step (1) mentioned above.

In the case of preparing an unfermented alcohol-containing beer-taste beverage, a liquor can be added to the primary raw material liquid in the step (b) to obtain an alcohol-containing raw material liquid. Examples of the liquor to be added include, but are not particularly limited to, alcohols for raw materials, Shochu, Awamori, whiskey, brandy, and spirit such as vodka, rum, tequila, and gin.

Carbon dioxide can be added to the primary raw material liquid or the alcohol-containing raw material liquid by the carbonation treatment of the step (b) to obtain a carbonated beverage.

The method for adding carbon dioxide may be a method of directly adding carbon dioxide to the primary raw material liquid or the alcohol-containing raw material liquid, or may be an addition method of preparing such a raw material liquid in a concentrated state and then mixing the liquid with carbonated water. Additives such as a preservative, a sweetener, a fragrance, an acidulant, and a dye may be added, if necessary, when carbon dioxide is added.

Treatment to remove precipitates is preferably performed before the carbonation step in order to remove a sediment or a substances causative of off-flavor.

Then, the step of confirming and/or adjusting the contents of 4VG, ethyl n-butyrate, and the lactone is preferably performed as the step (c) in the same manner as in the step (3).

The step (c) may be performed between the step (a) and the step (b), may be performed after the step (a) and the step (b), or may be performed in parallel with the step (a) and/or the step (b).

The beer-taste beverage according to one aspect of the present invention thus obtained is packed into a predetermined container and distributed as a product to the market.

The method for packaging the beer-taste beverage is not particularly limited, and a packaging method well known to those skilled in the art can be used. By the packaging step, the beer-taste beverage according to the present invention is packed into a container, which is then hermetically closed. In the packaging step, a container having any form and material may be used. Examples of the container include the contents described in the section "1.4 Packaged beverage".

EXAMPLES

Hereinafter, the present invention will be described in more detail with reference to Examples. However, the present invention is not limited by these Examples.

Examples 1 to 18 and Comparative Examples 1 to 14

<Preparation of Beverage>

Crushed barley malt and an enzyme were added to a preparation tank containing 120 L of hot water. Then, the temperature was elevated in stages and held, and malt residues were removed by filtration to obtain wort. Then, the wort was added to a wort kettle, further hop was added, and molasse was added, if necessary, at the malt ratio described in Tables 1 to 4 to perform boiling treatment. After the boiling treatment, solid-liquid separation treatment was performed, and the obtained clear wort was cooled, followed by aeration with oxygen to obtain a pre-fermentation liquid before yeast addition.

To the pre-fermentation liquid thus obtained, beer yeast (top fermenting yeast) was added, and the mixture was fermented using a predetermined fermentation temperature and fermentation time and further subjected to a maturation period for approximately 1 week. Then, the yeast was removed by filtration. Then, extract adjustment water and each component were added for preparation, if necessary, such that 4VG, ethyl n-butyrate, γ-decanolactone, γ-undecalactone, and an original extract attained the values described in Tables 1 to 4 to obtain each beer-taste beverage.

In each of Examples and Comparative Examples, the type of the enzyme, the amount of the enzyme added, the timing of addition thereof, the set temperature and the holding time in each temperature region in preparing wort, etc. were appropriately set and each adjusted so as to attain the total polyphenol content and the proline content shown in Tables 1 to 4. The contents of 4VG, ethyl n-butyrate, γ-decanolactone, and γ-undecalactone were adjusted by appropriately setting the type of the yeast and the fermentation conditions and then adding each component, if necessary, so as to attain the contents shown in Tables 1 to 4.

<Sensory Evaluation>

The beverages obtained in Examples 1 to 18 and Comparative Examples 1 to 14 and cooled to approximately 4° C. were tasted by six regularly trained panelists and evaluated for the "presence or absence of fresh scent suitable for a beer-taste beverage" and the "presence or absence of sweet scent suitable for a beer-taste beverages" of each beverage at 0.1 intervals of scores in the range of 3 (maximum value) to 1 (minimum value) on the basis of scoring criteria given below, and average scores from the six panelists were calculated. The results are shown in Tables 1 to 4.

For the evaluation, samples conformable to the criteria "3", "2" and "1" given below were provided in advance, and the criteria were standardized among the panelists. In any sensory evaluation of Tables 1 to 4, difference by 2.0 or more in score to the same beverage was not confirmed among the panelists.

[Criteria for Presence or Absence of Fresh Scent Suitable for Beer-Taste Beverage]

"3": Strong fresh scent suitable for a beer-taste beverage was perceived.

"2": Fresh scent suitable for a beer-taste beverage was perceived.

"1": Little fresh scent suitable for a beer-taste beverage was perceived.

[Criteria for Presence or Absence of Sweet Scent Suitable for Beer-Taste Beverage]

"3": Strong sweet scent suitable for a beer-taste beverage was perceived.

"2": Sweet scent suitable for a beer-taste beverage was perceived.

"1": Little sweet scent suitable for a beer-taste beverage was perceived.

From the results of evaluating the "presence or absence of fresh scent suitable for a beer-taste beverage" and the "presence or absence of sweet scent suitable for a beer-taste beverage" described above, each beer-taste beverage was comprehensively evaluated on four scales according to criteria given below.

"A": The evaluation of both of the "presence or absence of fresh scent suitable for a beer-taste beverage" and the "presence or absence of sweet scent suitable for a beer-taste beverage" was 2.5 or more.

"B": The evaluation of both of the "presence or absence of fresh scent suitable for a beer-taste beverage" and the "presence or absence of sweet scent suitable for a beer-taste beverage" was 2.0 or more and did not correspond to the evaluation "A".

"C": The evaluation of one of the "presence or absence of fresh scent suitable for a beer-taste beverage" and the "presence or absence of sweet scent suitable for a beer-taste beverage" was less than 2.0.

"D": The evaluation of both of the "presence or absence of fresh scent suitable for a beer-taste beverage" and the "presence or absence of sweet scent suitable for a beer-taste beverage" was less than 2.0.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Content of 4VG | ppb by mass | 100 | 100 | 100 | 100 | 100 | 100 | 100 | 100 | 100 |
| Content of ethyl n-butyrate | ppb by mass | 242 | 180 | 180 | 180 | 180 | 180 | 220 | 220 | 220 |
| Content of γ-decanolactone | ppb by mass | 0.54 | 0.55 | 0.45 | 0.36 | 0.30 | 0.19 | 0.67 | 0.55 | 0.44 |
| Content of γ-undecalactone | ppb by mass | 0.59 | 0.55 | 0.45 | 0.36 | 0.30 | 0.21 | 0.67 | 0.55 | 0.44 |
| Total content of lactone [γ-decanolactone] + [γ-undecalactone] | ppb by mass | 1.13 | 1.10 | 0.90 | 0.72 | 0.60 | 0.40 | 1.34 | 1.10 | 0.88 |
| Original extract concentration | % by mass | 12.5 | 9.3 | 9.3 | 7.5 | 9.3 | 4.5 | 11.3 | 12.5 | 12.5 |

TABLE 1-continued

| | | Example 1 | Example 2 | Example 3 | Example 4 | Example 5 | Example 6 | Example 7 | Example 8 | Example 9 |
|---|---|---|---|---|---|---|---|---|---|---|
| Total polyphenol content | ppm by mass | 180 | 134 | 134 | 108 | 134 | 65 | 164 | 180 | 180 |
| Malt ratio | % by mass | 100 | 75 | 75 | 60 | 75 | 51 | 90 | 100 | 100 |
| Bitterness unit | BUs | 18.0 | 20.0 | 30.0 | 40.0 | 20.0 | 25.0 | 16.4 | 18.0 | 18.0 |
| Proline concentration | ppm by mass | 30.0 | 16.7 | 16.7 | 10.9 | 16.7 | 5.5 | 24.5 | 30.0 | 30.0 |
| [Ethyl n-butyrate]/[lactone] | — | 214.2 | 163.6 | 200.0 | 250.0 | 300.0 | 450.0 | 164.2 | 200.0 | 250.0 |
| [Ethyl n-butyrate + lactone] / [4VG] | — | 2.43 | 1.81 | 1.81 | 1.81 | 1.81 | 1.80 | 2.21 | 2.21 | 2.21 |
| [γ-Decanolactone] / [γ-undecalactone] | — | 0.92 | 1.00 | 1.00 | 1.00 | 1.00 | 0.90 | 1.00 | 1.00 | 1.00 |
| [Ethyl n-butyrate] / [γ-decanolactone] | — | 448.1 | 327.3 | 400.0 | 500.0 | 600.0 | 947.4 | 328.4 | 400.0 | 500.0 |
| [Ethyl n-butyrate] / [γ-undecalactone] | — | 410.2 | 327.3 | 400.0 | 500.0 | 600.0 | 857.1 | 328.4 | 400.0 | 500.0 |
| Presence or absence of fresh scent suitable for beer-taste beverage | | 2.7 | 2.0 | 2.2 | 2.7 | 2.8 | 3.0 | 2.3 | 2.7 | 2.8 |
| Presence or absence of sweet scent suitable for beer-taste beverage | | 2.7 | 3.0 | 2.8 | 2.3 | 2.2 | 2.0 | 2.2 | 2.5 | 2.8 |
| Comprehensive evaluation | | A | B | B | B | B | B | B | A | A |

TABLE 2

| | | Example 10 | Example 11 | Example 12 | Example 13 | Example 14 | Example 15 | Example 16 | Example 17 | Example 18 |
|---|---|---|---|---|---|---|---|---|---|---|
| Content of 4VG | ppb by mass | 100 | 100 | 100 | 100 | 100 | 100 | 100 | 100 | 100 |
| Content of ethyl n-butyrate | ppb by mass | 220 | 270 | 270 | 300 | 300 | 300 | 300 | 500 | 500 |
| Content of γ-decanolactone | ppb by mass | 0.37 | 0.68 | 0.54 | 0.91 | 0.75 | 0.60 | 0.50 | 1.52 | 0.54 |
| Content of γ-undecalactone | ppb by mass | 0.37 | 0.68 | 0.54 | 0.91 | 0.75 | 0.60 | 0.50 | 1.52 | 0.59 |
| Total content of lactone [γ-decanolactone] + [γ-undecalactone] | ppb by mass | 0.74 | 1.36 | 1.08 | 1.82 | 1.50 | 1.20 | 1.00 | 3.04 | 1.13 |
| Original extract concentration | % by mass | 9.3 | 12.5 | 12.5 | 12.5 | 9.3 | 12.5 | 9.3 | 15.0 | 12.5 |
| Total polyphenol content | ppm by mass | 134 | 180 | 180 | 180 | 134 | 180 | 134 | 217 | 180 |
| Malt ratio | % by mass | 75 | 100 | 100 | 100 | 75 | 100 | 75 | 100 | 100 |
| Bitterness unit | BUs | 20.0 | 18.0 | 18.0 | 18.0 | 20.0 | 18.0 | 20.0 | 50.0 | 18.0 |
| Proline concentration | ppm by mass | 16.7 | 30.0 | 30.0 | 30.0 | 16.7 | 30.0 | 16.7 | 36.1 | 30.0 |
| [Ethyl n-butyrate] / [lactone] | — | 297.3 | 198.5 | 250.0 | 164.8 | 200.0 | 250.0 | 300.0 | 164.5 | 442.5 |
| [Ethyl n-butyrate + lactone] / [4VG] | — | 2.21 | 2.71 | 2.71 | 3.02 | 3.02 | 3.01 | 3.01 | 5.03 | 5.01 |
| [γ-Decanolactone] / [γ-undecalactone] | — | 1.00 | 1.00 | 1.00 | 1.00 | 1.00 | 1.00 | 1.00 | 1.00 | 0.92 |
| [Ethyl n-butyrate] / [γ-decanolactone] | — | 594.6 | 397.1 | 500.0 | 329.7 | 400.0 | 500.0 | 600.0 | 328.9 | 925.9 |
| [Ethyl n-butyrate] / [γ-undecalactone] | — | 594.6 | 397.1 | 500.0 | 329.7 | 400.0 | 500.0 | 600.0 | 328.9 | 847.5 |
| Presence or absence of fresh scent suitable for beer-taste beverage | | 2.3 | 2.7 | 2.8 | 2.0 | 2.2 | 2.7 | 2.8 | 2.0 | 2.3 |
| Presence or absence of sweet scent suitable for beer-taste beverage | | 2.3 | 2.8 | 2.7 | 3.0 | 2.8 | 2.3 | 2.2 | 3.0 | 2.3 |
| Comprehensive evaluation | | B | A | A | B | B | B | B | B | B |

TABLE 3

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Content of 4VG | ppb by mass | 100 | 100 | 100 | 100 | 100 | 100 | 100 | 100 | 100 |

TABLE 3-continued

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Content of ethyl n-butyrate | ppb by mass | 68 | 69 | 75 | 93 | 100 | 108 | 111 | 113 | 114 |
| Content of γ-decanolactone | ppb by mass | 0.57 | 0.36 | 0.38 | 0.52 | 0.54 | 0.39 | 0.44 | 0.36 | 0.41 |
| Content of γ-undecalactone | ppb by mass | 0.50 | 0.44 | 0.45 | 0.44 | 0.55 | 0.51 | 0.52 | 0.53 | 0.50 |
| Total content of lactone [γ-decanolactone] + [γ-undecalactone] | ppb by mass | 1.07 | 0.80 | 0.83 | 0.96 | 1.09 | 0.90 | 0.96 | 0.89 | 0.91 |
| Original extract concentration | % by mass | 13.0 | 11.0 | 11.2 | 12.1 | 13.6 | 13.2 | 9.8 | 11.0 | 11.6 |
| Total polyphenol content | ppm by mass | 197 | 136 | 142 | 185 | 130 | 183 | 140 | 126 | 217 |
| Malt ratio | % by mass | 100 | 100 | 67 | 100 | 100 | 100 | 67 | 67 | 100 |
| Bitterness unit | BUs | 35.0 | 20.8 | 20.2 | 29.9 | 42.4 | 21.3 | 23.6 | 21.0 | 27.6 |
| Proline concentration | ppm by mass | 31.3 | 26.4 | 18.1 | 29.3 | 32.9 | 31.8 | 15.9 | 17.7 | 27.9 |
| [Ethyl n-butyrate] / [lactone] | — | 63.7 | 86.7 | 90.9 | 97.1 | 91.6 | 120.5 | 115.5 | 126.8 | 125.7 |
| [Ethyl n-butyrate + lactone] / [4VG] | — | 0.69 | 0.70 | 0.76 | 0.94 | 1.01 | 1.09 | 1.12 | 1.14 | 1.15 |
| [γ-Decanolactone] / [γ-undecalactone] | — | 1.14 | 0.82 | 0.84 | 1.18 | 0.98 | 0.76 | 0.85 | 0.68 | 0.82 |
| [Ethyl n-butyrate] / [γ-decanolactone] | — | 119.6 | 192.7 | 198.5 | 179.2 | 184.9 | 278.1 | 252.0 | 313.5 | 279.1 |
| [Ethyl n-butyrate] / [γ-undecalactone] | — | 136.4 | 157.6 | 167.6 | 211.8 | 181.5 | 212.6 | 213.2 | 212.9 | 228.8 |
| Presence or absence of fresh scent suitable for beer-taste beverage | | 1.0 | 1.2 | 1.4 | 1.6 | 1.2 | 1.4 | 1.6 | 1.6 | 1.6 |
| Presence or absence of sweet scent suitable for beer-taste beverage | | 2.4 | 1.8 | 1.6 | 2.2 | 2.2 | 1.8 | 1.8 | 1.8 | 1.8 |
| Comprehensive evaluation | | C | D | D | C | C | D | D | D | D |

TABLE 4

| | | Comparative Example 10 | Comparative Example 11 | Comparative Example 12 | Comparative Example 13 | Comparative Example 14 |
|---|---|---|---|---|---|---|
| Content of 4VG | ppb by mass | 100 | 100 | 1500 | 3000 | 100 |
| Content of ethyl n-butyrate | ppb by mass | 116 | 128 | 148 | 171 | 1300 |
| Content of γ-decanolactone | ppb by mass | 0.60 | 0.60 | 0.66 | 0.52 | 0.60 |
| Content of γ-undecalactone | ppb by mass | 0.57 | 0.59 | 0.62 | 0.68 | 0.57 |
| Total content of lactone [γ-decanolactone] + [γ-undecalactone] | ppb by mass | 1.17 | 1.19 | 1.28 | 1.20 | 1.17 |
| Original extract concentration | % by mass | 13.0 | 15.9 | 12.5 | 11.1 | 13.0 |
| Total polyphenol content | ppm by mass | 135 | 140 | 132 | 140 | 135 |
| Malt ratio | % by mass | 100 | 100 | 67 | 67 | 100 |
| Bitterness unit | BUs | 18.1 | 61.3 | 18.3 | 11.6 | 18.1 |
| Proline concentration | ppm by mass | 31.2 | 38.4 | 20.1 | 17.9 | 31.2 |
| [Ethyl n-butyrate]/[lactone] | — | 98.8 | 108.0 | 115.2 | 142.3 | 1111.1 |
| [Ethyl n-butyrate + lactone] / [4VG] | — | 1.17 | 1.30 | 0.10 | 0.06 | 13.01 |
| [γ-Decanolactone] / [γ-undecalactone] | — | 1.05 | 1.02 | 1.06 | 0.76 | 1.05 |
| [Ethyl n-butyrate] / [γ-decanolactone] | — | 192.7 | 214.1 | 223.5 | 328.5 | 2166.7 |

TABLE 4-continued

| | | Comparative Example 10 | Comparative Example 11 | Comparative Example 12 | Comparative Example 13 | Comparative Example 14 |
|---|---|---|---|---|---|---|
| [Ethyl n-butyrate] / [γ-undecalactone] | — | 202.9 | 217.8 | 237.9 | 251.2 | 2280.7 |
| Presence or absence of fresh scent suitable for beer-taste beverage | | 1.4 | 1.8 | 1.6 | 1.8 | 3.0 |
| Presence or absence of sweet scent suitable for beer-taste beverage | | 1.8 | 1.6 | 2.0 | 2.0 | 1.0 |
| Comprehensive evaluation | | D | D | C | C | C |

As seen from the results shown in Tables 1 and 2, the beverages prepared in Examples 1 to 18 offered perceivable well-balanced fresh scent and sweet scent suitable for a beer-taste beverage. On the other hand, as seen from the results shown in Tables 3 and 4, the beverages prepared in Comparative Examples 1 to 14 offered unbalanced fresh scent and sweet scent suitable for a beer-taste beverage because at least one of the fresh scent and the sweet scent was weak.

Examples 19 to 27 and Comparative Example 15

<Preparation of Beverage>

4VG was added to the beverage prepared in Example 1 to prepare a beverage having the content of 4VG shown in Table 5.

<Sensory Evaluation>

The beverages obtained in Examples 1 and 19 to 27 and Comparative Example 15 and cooled to approximately 4° C. were tasted by six regularly trained panelists and evaluated for the "presence or absence of unsuitable smoke scent" of each beverage at 0.1 intervals of scores in the range of 3 (maximum value) to 1 (minimum value) on the basis of scoring criteria given below, and average scores from the six panelists were calculated. The results are shown in Table 5.

For the evaluation, samples conformable to the criteria "3", "2" and "1" given below were provided in advance, and the criteria were standardized among the panelists. In any sensory evaluation of Table 5, difference by 2.0 or more in score to the same beverage was not confirmed among the panelists.

[Criteria for Presence or Absence of Unsuitable Smoke Scent]

"3": No unsuitable smoke scent was perceived.
"2": Little unsuitable smoke scent was perceived.
"1": Strong unsuitable smoke scent was perceived.

As seen from the results shown in Table 5, the beverages prepared in Examples 1 and 19 to 27 suppressed unsuitable smoke scent. On the other hand, unsuitable smoke scent was strongly perceived in the beverage prepared in Comparative Example 15.

Each beverage prepared in Examples 19 to 27 and Comparative Example 15 was sensorily evaluated for the "presence or absence of fresh scent suitable for a beer-taste beverage" and the "presence or absence of sweet scent suitable for a beer-taste beverage" by the same method as mentioned above, and comprehensively evaluated on three scales according to the same criteria as described above from the evaluation thereof. As a result of the comprehensive evaluation, the beverages of Examples 19 to 27 were given "A" or "B" in the evaluation, whereas the beverage of Comparative Example 15 was given "C" in the evaluation.

The invention claimed is:

1. A beer-taste beverage
comprising 1000 ppb by mass or less of 4-vinylguaiacol, having an ethyl n-butyrate content of 140 ppb by mass or more, and
comprising at least one lactone selected from γ-decanolactone and γ-undecalactone, wherein a ratio of the content, ppb by mass, of ethyl n-butyrate to the total content, ppb by mass, of the lactone is 1100 or less.

2. The beer-taste beverage according to claim 1, wherein the total content of the lactone is 0.01 ppb by mass or more.

3. The beer-taste beverage according to claim 1, wherein a ratio of the total content, ppb by mass, of ethyl n-butyrate and the lactone to the content, ppb by mass, f 4-vinylguaiacol is 1.5 to 11.0.

4. The beer-taste beverage according to claim 1, wherein the beer-taste beverage has a bitterness unit of less than 60 BUs.

5. The beer-taste beverage according to claim 1, wherein the beer-taste beverage is a fermented beer-taste beverage.

TABLE 5

| | | Example 1 | Example 19 | Example 20 | Example 21 | Example 22 | Example 23 |
|---|---|---|---|---|---|---|---|
| Content of 4VG | ppb by mass | 100 | 200 | 300 | 400 | 500 | 600 |
| Presence or absence of unsuitable smoke scent | | 3.0 | 3.0 | 3.0 | 3.0 | 3.0 | 2.5 |

| | | Example 24 | Example 25 | Example 26 | Example 27 | Comparative Example 15 |
|---|---|---|---|---|---|---|
| Content of 4VG | ppb by mass | 700 | 800 | 900 | 1000 | 1100 |
| Presence or absence of unsuitable smoke scent | | 2.3 | 2.2 | 2.0 | 2.0 | 1.7 |

6. The beer-taste beverage according to claim 1, wherein the beer-taste beverage has an original extract concentration of 4.0 to 20.0% by mass.

7. The beer-taste beverage according to claim 1, wherein the beer-taste beverage has a total polyphenol content of 60 to 300 ppm by mass.

8. The beer-taste beverage according to claim 1, wherein the beer-taste beverage has a proline concentration of 3.5 to 60.0 ppm by mass.

9. The beer-taste beverage according to claim 1, wherein the beer-taste beverage has a malt ratio of 50 to 100% by mass.

10. A beer-taste beverage wherein a ratio of the total content, ppb by mass, of ethyl n-butyrate and at least one lactone selected from γ-decanolactone and γ-undecalactone to the content, ppb by mass, of 4-vinylguaiacol is 1.5 to 11.0.

11. A method for producing a beer-taste beverage according to claim 1, comprising the step of adding yeast to raw materials including water and malt to perform alcoholic fermentation.

12. The method for producing a beer-taste beverage according to claim 11, wherein the yeast is top fermenting yeast.

\* \* \* \* \*